United States Patent
Okawa

(10) Patent No.: US 8,767,520 B2
(45) Date of Patent: Jul. 1, 2014

(54) METHOD OF PRODUCING RECORDING MEDIUM, AND RECORDING MEDIUM

(71) Applicants: Sony Corporation, Tokyo (JP); Sony DADC Corporation, Tokyo (JP)

(72) Inventor: Naoki Okawa, Shizuoka (JP)

(73) Assignees: Sony Corporation (JP); Sony DADC Corporation (JP)

( * ) Notice: Subject to any disclaimer, the term of this patent is extended or adjusted under 35 U.S.C. 154(b) by 0 days.

(21) Appl. No.: 13/865,410

(22) Filed: Apr. 18, 2013

(65) Prior Publication Data

US 2013/0294216 A1 Nov. 7, 2013

(30) Foreign Application Priority Data

Apr. 27, 2012 (JP) ................. 2012-102238

(51) Int. Cl.
G11B 7/2403 (2013.01)
B05D 3/00 (2006.01)

(52) U.S. Cl.
USPC .................. 369/283; 428/64.4; 427/532

(58) Field of Classification Search
CPC ................. G11B 7/2403; B05D 3/00
USPC .......... 369/283; 428/64.1, 64.4; 427/532, 553
See application file for complete search history.

(56) References Cited

U.S. PATENT DOCUMENTS

| | | | | |
|---|---|---|---|---|
| 6,030,681 | A * | 2/2000 | Czubarow et al. | 428/846.2 |
| 6,319,581 | B1 * | 11/2001 | Tamura | 428/64.1 |
| 6,811,948 | B2 * | 11/2004 | Shuy et al. | 430/270.12 |
| 7,270,865 | B2 * | 9/2007 | Gore | 428/64.4 |
| 8,030,434 | B2 * | 10/2011 | Ikeda et al. | 528/271 |
| 2007/0098946 | A1 * | 5/2007 | Kikukawa et al. | 428/64.4 |
| 2010/0129098 | A1 | 5/2010 | Aoki | |

FOREIGN PATENT DOCUMENTS

JP 2010-123230 A 6/2010

* cited by examiner

*Primary Examiner* — Angel Castro
(74) *Attorney, Agent, or Firm* — Lerner, David, Littenberg, Krumholz & Mentlik, LLP

(57) ABSTRACT

A method of producing a recording medium includes preparing a substrate of the recording medium, forming a first face recording layer at a first face side of the substrate, forming a first face protection layer for protecting the first face recording layer on the first face recording layer, forming a second face constituting whole or a part of a layer configuration at a second face side of the substrate,
deactivating a protection feature of the first face protection layer; and forming a first face constituting whole or a part of a layer configuration of a first face on the first face protection layer.

8 Claims, 9 Drawing Sheets

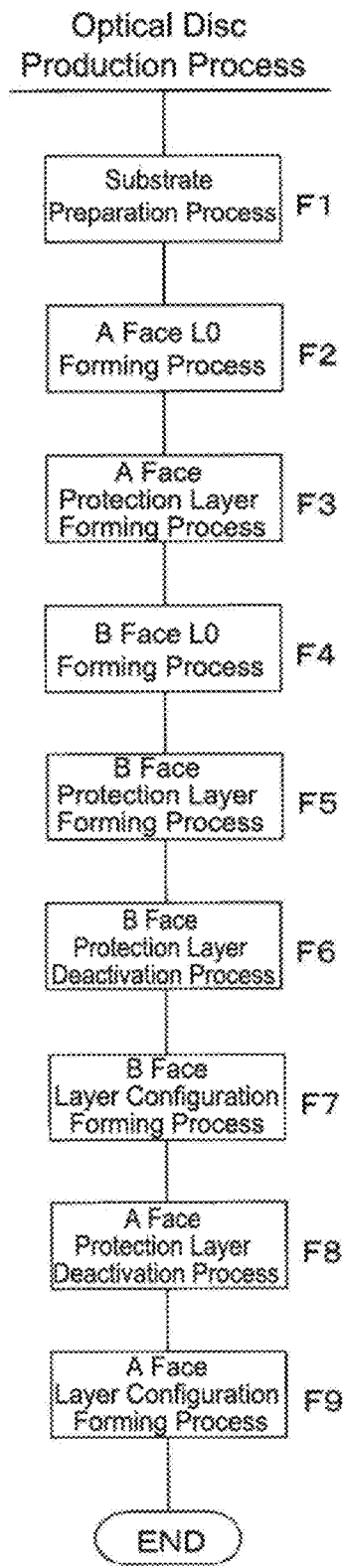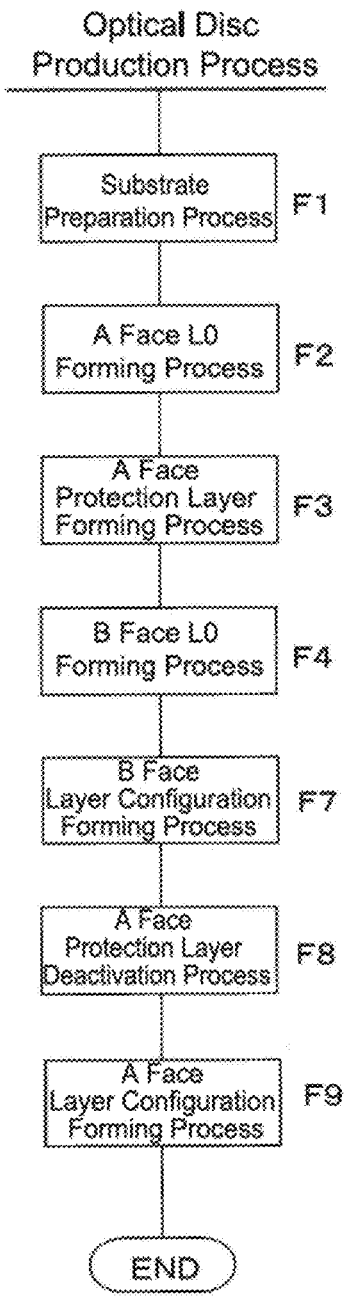

Turn Over

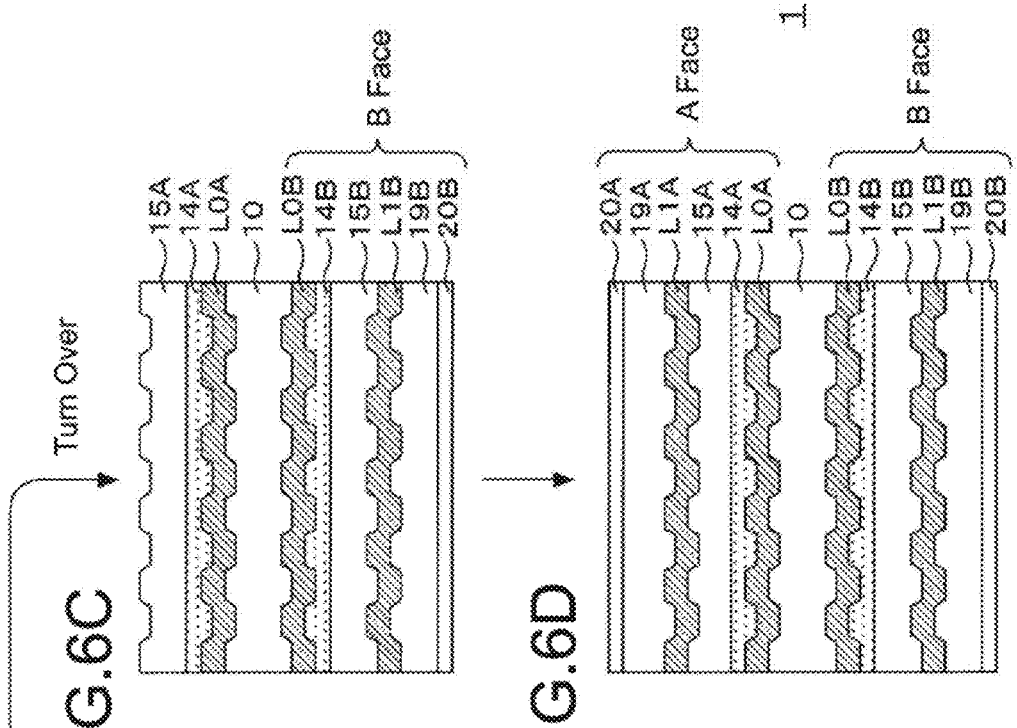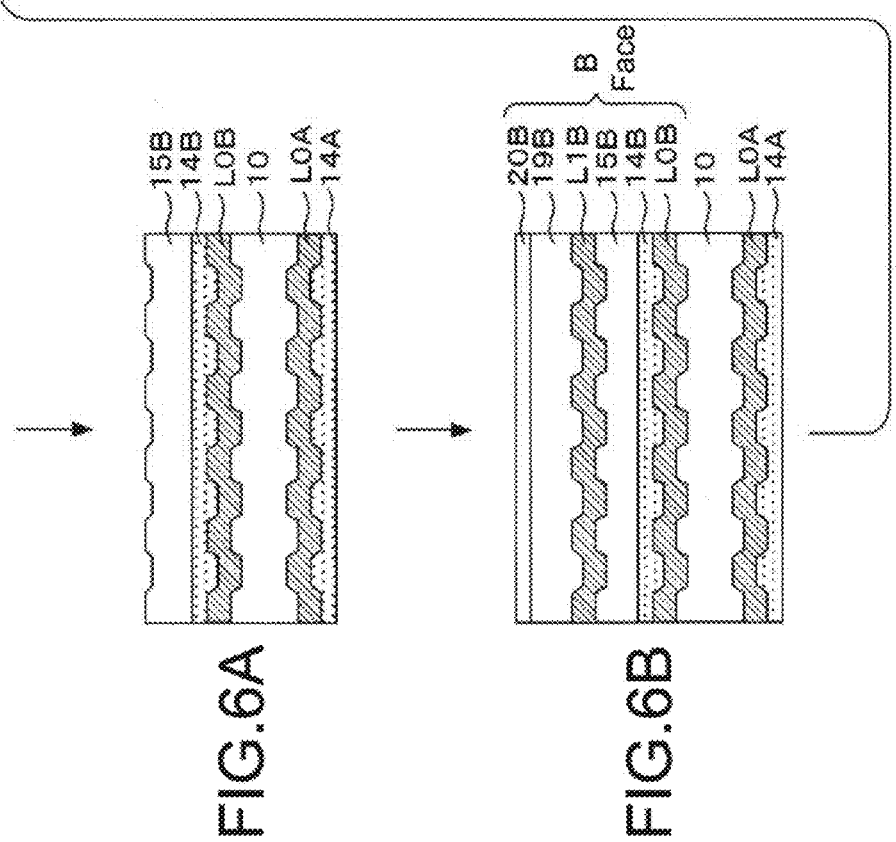

FIG.9A  Without Deactivation Treatment
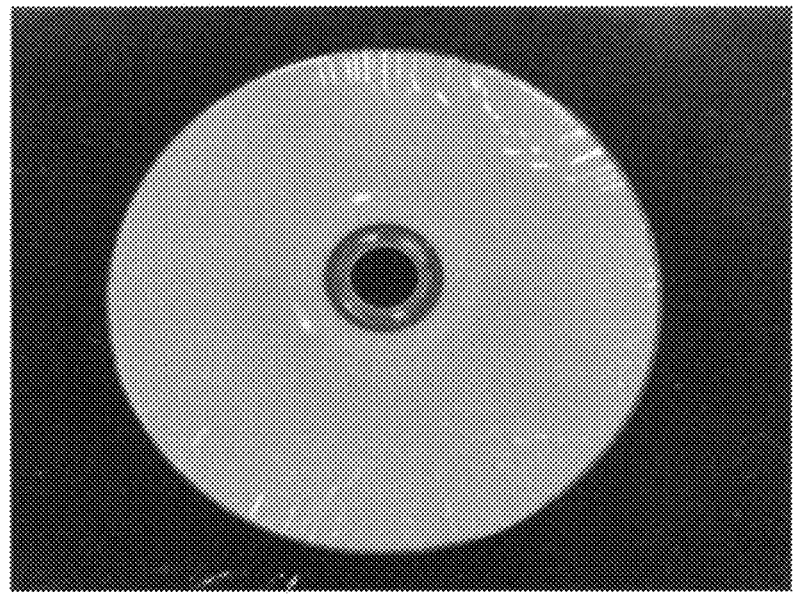
FIG.9B  With Deactivation Treatment

METHOD OF PRODUCING RECORDING MEDIUM, AND RECORDING MEDIUM

CROSS-REFERENCE TO RELATED APPLICATION

The present application claims priority from Japanese Patent Application No. JP 2012-102238 filed in the Japanese Patent Office on Apr. 27, 2012, the entire content of which is incorporated herein by reference.

BACKGROUND

The present disclosure relates to a method of producing a recording medium, and a recording medium produced by the method. In particular, the present disclosure relates to a recording medium including recording layers formed on both faces of a substrate.

SUMMARY

Optical discs, such as CDs (Compact Discs), DVDs (Digital Versatile Discs) and BD (Blu-ray Discs™), are widely known.

These optical discs are produced by preparing a master having a pit column pattern or a groove pattern, forming a stamper from the master, forming a disc substrate using the stamper, and forming a layer configuration including a recording layer on the disc substrate. Japanese Patent Application Laid-open No. 2010-123230 discloses an example of a process of producing an optical disc.

In the recording medium such as the optical disc, an increase in a recording capacity is demanded. An effective measure to increase the capacity is to form a plurality of multilayered recording layers in a thickness direction of the optical disc.

A typical multilayered disc has a configuration that all recording layers are disposed on one face of the disc substrate. Alternatively, the recording layers may be disposed on both faces of the disc substrate, which is called as "double-sided disc" for explanation.

The double-sided disc has a problem that flaws and dirt are easily generated on the recording layer during the production.

During the production process of the double-sided disc, one recording layer is formed on one face of the substrate, the substrate is turned over, and then the other recording layer is formed on the other face of the substrate. The recording layer formerly produced may be turned downward, and be in contact with a conveyor or a transfer table on which the disc is transferred during the production, or with a turntable of a spin coating apparatus.

In other words, one recording layer may be in contact with a transfer path or a transfer table, which may result in flaws, dusts, or other dirt attached to the recording layer. As a matter of course, the recording layer has significantly lowered quality.

In order to prevent this, a strict control such as a protection material placement and entire removal of dirt and dusts may be necessary at a place where the recording layer is contacted, e.g., at the transfer table. As a result, a production line construction and its maintenance will be very costly.

It is desirable to provide a method of producing a recording medium capable of keeping its quality with no special treatment or maintenance of a transfer table in contact with a recording layer.

According to an embodiment of the present disclosure, there is provided a method of producing a recording medium including preparing a substrate of the recording medium, forming a first face recording layer at a first face side of the substrate, forming a first face protection layer for protecting the first face recording layer on the first face recording layer, forming a second face constituting whole or a part of a layer configuration at a second face side of the substrate, deactivating a protection feature of the first face protection layer, and forming a first face constituting whole or a part of a layer configuration of a first face on the first face protection layer.

According to an embodiment of the present disclosure, there is provided a recording medium produced by the production method according to an embodiment of the present disclosure.

The recording medium according to an embodiment of the present disclosure includes one or a plurality of recording layers formed on a first face and a second face of a substrate at both faces, a first face protection layer formed in contact with at least one recording layer on the first face, and a second face protection layer formed in contact with at least one recording layer on the second face. A layer configuration of the first face and a layer configuration of the second face are symmetric with respect to a center of the substrate.

In the production method, after the first face protection layer is formed on the first face recording layer, a second face is formed. In forming the second face, the first face will be in contact with a transfer path or a transfer table. In this case, the first face protection layer having a protection feature such as foreign matter attachment prevention will be in contact with it to protect the first face recording layer. In other words, flaws, dusts, etc. are preventing from attaching.

When the layer configuration is then formed on the first face recording layer and the first face protection layer holds the protection feature, a resin cannot be successfully applied to an upper face for forming a layer configuration. In this case, after the protection feature of the first face protection layer is deactivated, the layer configuration of the first face is formed.

Since the protective layers are formed on both first and second faces and the layer configurations are symmetric with respect to the center of the substrate, the recording medium to be produced is less suffered from warping due to a temperature change.

According to an embodiment of the present disclosure, the high quality recording medium having the layer configurations on both faces of the substrate can be produced without attaching flaws and dusts to the first face recording layer during the production process. Also, this allows the costs of the production line to be decreased.

Furthermore, as the layer configurations of the recording medium are symmetric with respect to the center of the substrate, there can be provided the recording medium that is not warped due to a temperature change.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 3A is a flow chart for producing the optical disc in the first embodiment;

FIG. 3B is a flow chart for producing an optical disc in a second embodiment;

FIGS. 6A, 6B, 6C and 6D are illustration diagrams for producing the optical disc in the first embodiment;

FIGS. 9A and 9B are each a photograph of the optical disc to which resin is applied with/without a deactivation treatment of the protection layer.

DETAILED DESCRIPTION OF EMBODIMENTS

Hereinafter, an embodiment of the present disclosure will be described with reference to the drawings.

The embodiments of the present disclosure will be described in the following order. In the embodiment, an optical disc (double-sided disc) is produced.

<1. Optical Disc Configuration>
<2. Production Process of Optical Disc and Optical Disc in First Embodiment>
<3. Production Process of Optical Disc in Second Embodiment>
<4. Experimental Results>
<5. Modifications>

1. Optical Disc Configuration

Figure 1A:
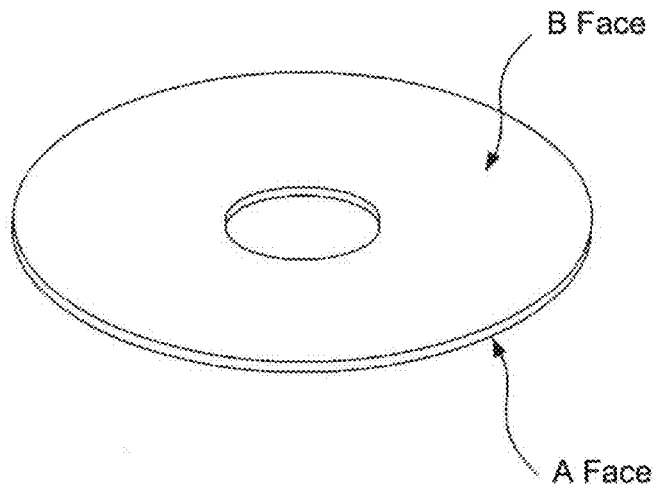
FIGS. 1A and 1B are each an illustration diagram of an optical disc according to an embodiment of the present disclosure.
Figure 1B:
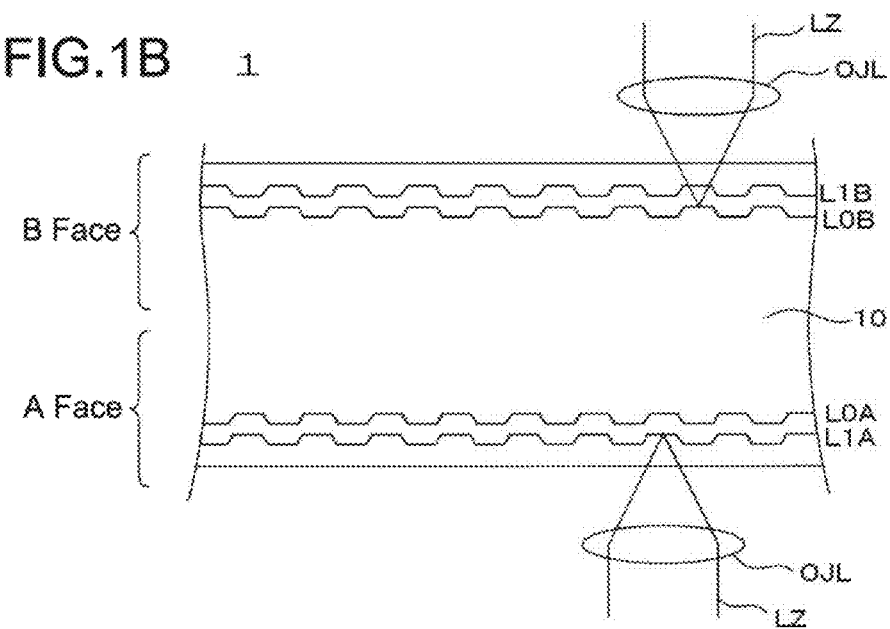

FIGS. 1A and 1B are each an illustration diagram of an optical disc according to an embodiment of the present disclosure. An optical disc 1 according to the embodiment has a flat disc shape, as shown in FIG. 1A, and has, for example, a diameter of 12 cm and a thickness of about 1.2 mm. Its appearance is almost same as those of the CDs, DVDs, BDs and the like in the past.

The optical disc 1 is a double-sided disc having layer configurations on both faces of a substrate. FIG. 1B shows a schematic section configuration of the optical disc 1. For example, a substrate 10 is formed with polycarbonate. On one face (a lower face shown in FIG. 1B) of the substrate 10, two recording layers L0A and L1A are formed. On the other face (an upper face shown in FIG. 1B), two recording layers L0B and L1B are formed.

The "recording layer" records or regenerates information. For example, in a read-only optical disc, emboss pit lines are formed on the recording layer. The pit lines are irradiated with a laser light. With a reflected laser light, the information is regenerated.

In a recordable disc of a direct read after write type such as a write once type or an erasable type such as a rewritable type, wobbling grooves are often formed on the recording layer. The wobbling grooves are used as recording tracks, and mark lines are formed by irradiating them with a laser having a recording power. Upon regeneration, by the reflected laser light from the mark lines, the information is regenerated. The "mark" collectively refers to a variety of marks formed on the recording medium including a phase change mark, a pigment change mark, an interference fringe mark, a refractive index change mark, a void (hole) mark and an exposure mark.

In the recording layers L0A, L1A, L0B and L1B shown in FIG. 1B, the emboss pit lines or the wobbling grooves are formed, and the information is regenerated and recorded.

The recording layers L0A and the L1A are irradiated with a laser light LZ from an objective lens OJL shown lower in FIG. 1B.

The recording layers L0B and the L1B are irradiated with a laser light LZ from an objective lens OJL shown upper in FIG. 1B.

For explanation, a side of the recording layers L0A and L1A refers to an "A face", and a side of the recording layers L0B and L1B refers to a "B face".

Hereinafter, the recording layer L0A refers to an A face first recording layer, the recording layer L1A refers to an A face second recording layer, the recording layer L0B refers to a B face first recording layer, and the recording layer L1B refers to a B face second recording layer.

Figure 2:
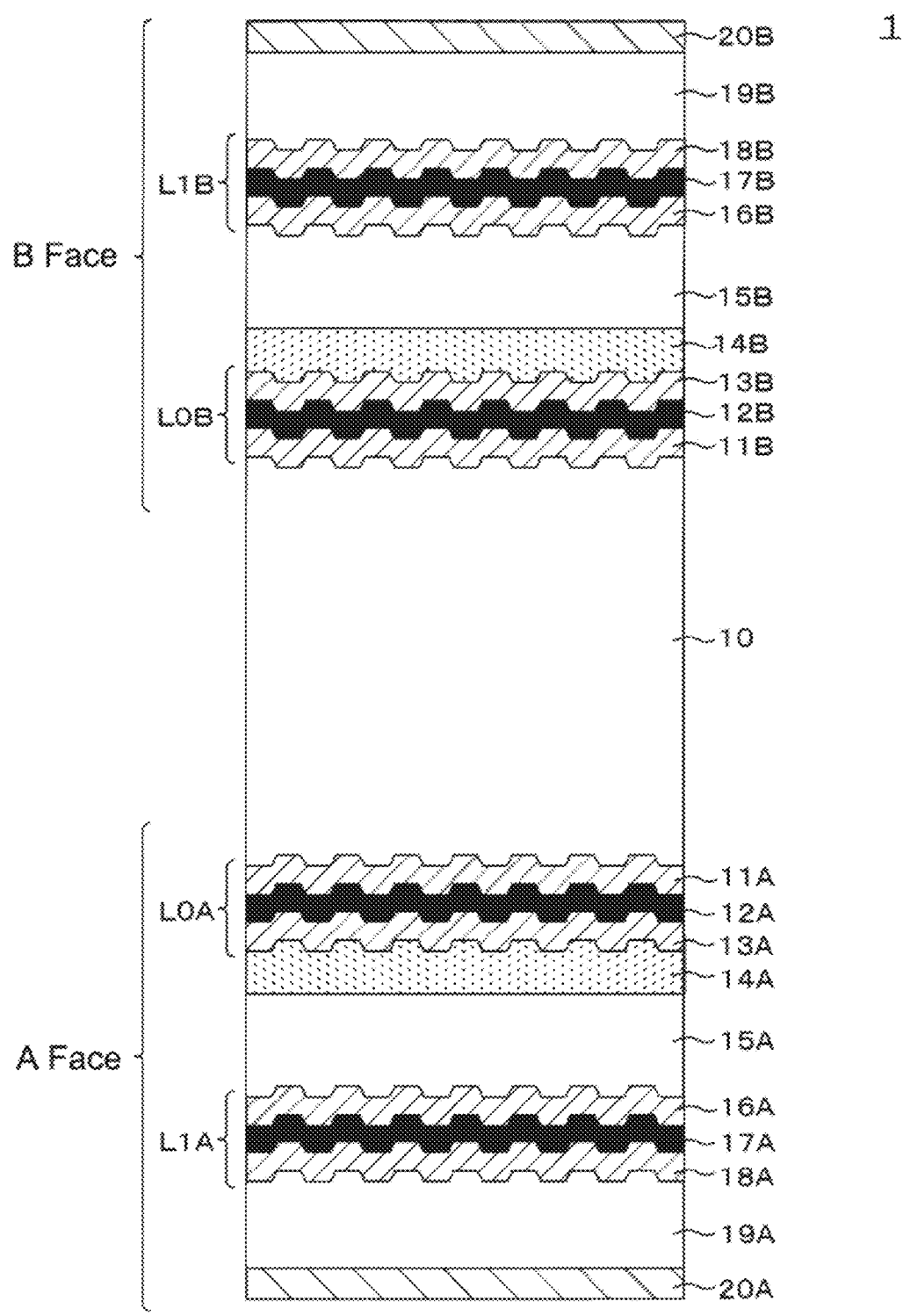
FIG. 2 is an illustration diagram of layer configurations of the optical disc in a first embodiment.

FIG. 2 schematically shows the detailed layer configurations of the optical disc 1 according to the embodiment.

As shown in FIG. 2, in the optical disc 1, the substrate 10 having a thickness of about 1 mm is disposed at the center, and respective layer configurations on the A and B faces at upper and lower sides are formed.

First, the A face at the lower side of the substrate 10 will be described. Each thickness value in each layer described below is only an example.

For example, a dielectric 11A having a thickness of 15 nm, a recording film 12A having a thickness of 40 nm and a dielectric 13A having a thickness of 15 nm are disposed on the substrate 10 at a lower side in FIG. 2. FIG. 2 shows a write once type disc having a configuration of the dielectric, the recording film and the dielectric. The dielectric 11A, the recording film 12A and the dielectric 13A form the A face first recording layer L0A.

Then, a protection layer 14A having a thickness of 3 μm and an intermediate layer 15A having a thickness of 22 μm are disposed, for example. A dielectric 16A having a thickness of 15 nm, a recording film 17A having a thickness of 40 nm, and a dielectric 18A having a thickness of 15 nm are disposed, for example. The dielectric 16A, the recording film 17A, and the dielectric 18A form the A face second recording layer L1A.

In addition, a cover layer 19A having a thickness of 72 μm is formed, for example. On a surface of the cover layer 19A, a hard coat layer 20A having a thickness of about 3 μm is formed.

A B face side of the substrate 10 shown upper in FIG. 2 has a symmetric configuration of that at an A face side.

For example, a dielectric 11B having a thickness of 15 nm, a recording film 12A having a thickness of 40 nm and a dielectric 13B having a thickness of 15 nm are disposed on the substrate 10 at an upper side in FIG. 2. The dielectric 11B, the recording layer 12B and the directric 13B form the B face first recording layer L0B.

Then, a protection layer 14B having a thickness of 3 μm and an intermediate layer 15B having a thickness of 22 μm are disposed, for example. A dielectric 16B having a thickness of 15 nm, a recording film 17B having a thickness of 40 nm, and a dielectric 18B having a thickness of 15 nm are disposed, for example. The dielectric 16B, the recording film 17b, and the dielectric 18B form the B face second recording layer L1B.

In addition, a cover layer 19B having a thickness of 72 μm is formed, for example. On a surface of the cover layer 19B, a hard coat layer 20B having a thickness of about 3 μm is formed.

The A and B faces are symmetric with respect to the center of the substrate 10.

At the A face side, the A face first recording layer L0A and the A face second recording layer L1A are disposed via the intermediate layer 15A (and the protection layer 14A). The cover layer 19A and the hard coat layer 20A constitute the surface on which the laser light is incident.

Also, at the B face side, the B face first recording layer L0B and the B face second recording layer L1B are disposed via the intermediate layer 15B (and the protection layer 14B). The cover layer 19B and the hard coat layer 20B constitute the surface on which the laser light is incident.

Thus, the optical disc 1 according to the embodiment is a double-sided disc having four recording layers (L0A, L1A, L0B and L1B).

2. Production Process of Optical Disc and Optical Disc in First Embodiment

The method of producing the optical disc 1 according to the embodiment of the present disclosure as the double-sided disc includes a process of forming the protection layers 14A and 14B.

As an example, a production process of the double-sided disc includes forming a recording layer on one face of a substrate, turning over the substrate, and forming a recording layer on the other face of the substrate. In this case, the recording layer previously formed faces downward. When the disc in production is contacted with a transfer table or the like, flaws, dusts, or dirt (collectively referred to as foreign matters) may be attached to the recording layer. As a result, the recording layer may have significantly lowered quality.

According to the production method in the embodiment, the protection layer for protecting the recording layer previously formed is formed, thereby preventing from flaws and foreign matters attaching to the recording layer during the production. Also, subsequent production processes may be performed properly.

FIG. 3A is a flow chart for producing the optical disc in the first embodiment. Firstly, overall production processes will be briefly described.

In a process F1 of preparing the substrate, the substrate 10 of the optical disc 1 is prepared.

In a process F2 of forming the A face L0, the A face first recording layer L0A is formed at the A face side of the substrate 10.

In a process F3 of forming the A face protection layer, the protection layer 14A having a feature of protecting the A face first recording layer L0A is formed.

Subsequently, the disc in production is turned over upside-down, is transferred and the like. The B face forming all or a part of the layer configuration at the B face side of the substrate is formed.

First, in a process F4 of forming the B face L0, the B face first recording layer L0B is formed at the B face side of the substrate 10.

Next, in a process F5 of forming the B face protection layer, the B face protection layer 14B having a feature of protecting the B face first recording layer L0B is formed on the B face first recording layer L0B.

Then, in a process F6 of deactivating the B face protection layer, the protection feature of the B face protection layer is deactivated.

Thereafter, in a process F7 of forming the B face layer configuration, the layer configuration including the B face second recording layer L1B is formed on the B face protection layer 14B.

Subsequently, the disc in production is turned over upside-down, is transferred and the like. The A face forming all or a part of the layer configuration at the A face side of the substrate 10 is formed.

First, in a process F8 of deactivating the A face protection layer, the protection feature of the A face protection layer is deactivated.

Subsequently, in a process F9 of forming the A face layer configuration, the layer configuration including the A face second recording layer L1A is formed on the A face protection layer.

By the above-described processes, the optical disc 1 having the configuration shown in FIG. 2 is formed, for example.

The production processes shown in FIG. 3A will be described in detail using a process flow chart shown in FIG. 4 and schematic diagrams shown in FIGS. 5 and 6.

Figure 4:
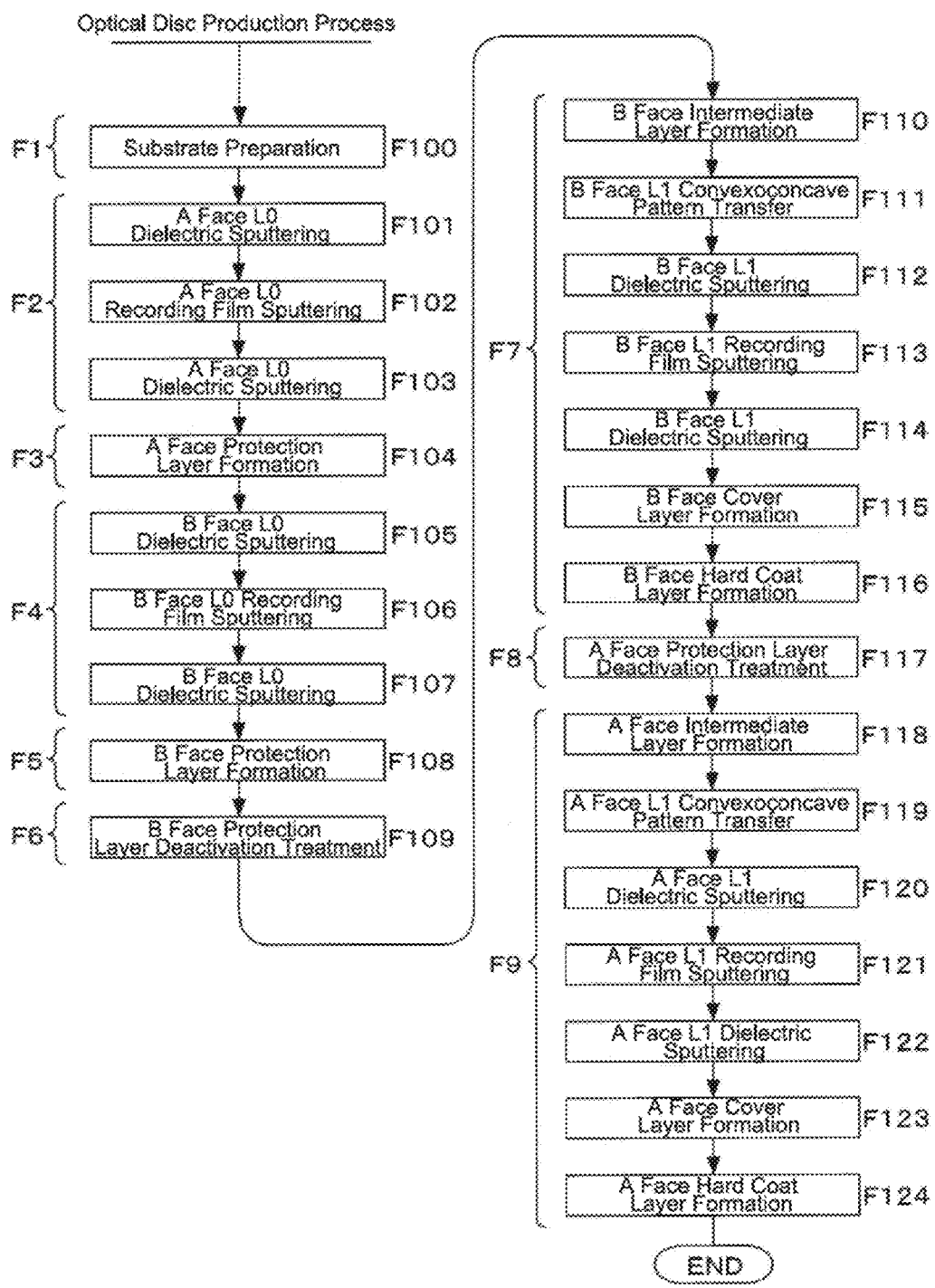
FIG. 4 is a detailed flow chart for producing the optical disc in the first embodiment.

In FIG. 4, each process is correlated to each process of F1 to F9 shown in FIG. 3A. FIGS. 5 and 6 schematically show the status of the production of the optical disc 1.

Hereinafter, each process is described together with each process of F1 to F9 shown in FIG. 3A.

[Substrate Preparation Process F1]

In a process F100 shown in FIG. 4, the substrate 10 is prepared.

Before the process of preparing the substrate F1, a stamper for the A face first recording layer L0A, a stamper for the A face second recording layer L1A, a stamper for the B face first recording layer L0B, and a stamper for the B face second recording layer L1B are produced. Each stamper is formed from the master.

The process of producing the stamper will be briefly described.

First, the master is produced by mastering of a PTM (Phase Transition Mastering) method using an inorganic resist material, for example. The master having the resist layer formed of the inorganic resist is irradiated with a laser light by a mastering apparatus, and is exposed corresponding to the wobbling grooves to be formed. When the read-only optical disc is produced, the mastering apparatus irradiates the laser light modulated depending on the data to be recorded, and exposes in a pattern corresponding to the pit lines. An example of the production of the groove disc will be described below.

After the exposure pattern of the wobbling grooves is spirally formed on the master, the exposed master is developed to produce the master having a concave shape on an exposed part, i.e., a grooved part.

Using the master, the stamper is produced. For example, the stamper is produced to have a convexoconcave pattern of the master that is transferred by a nickel electroforming process using the master.

For each of the recording layers L0A, L1A, L0B and L1B, the stamper is produced by the above-described processes. Using the stamper, the optical disc is produced as follows:

In the process F100 of preparing the substrate shown in FIG. 4, the stamper for the A face first recording layer L0A and the stamper for the B face first recording layer L0B are set on a mold, and a polycarbonate resin is injection molded to prepare the substrate 10, for example.

Figure 5A:
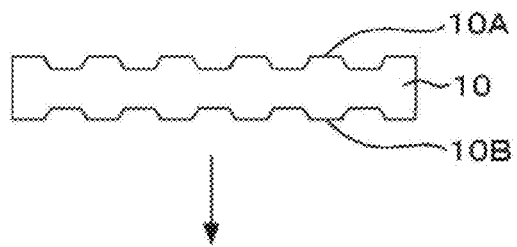
FIGS. 5A, 5B, 5C, 5D and 5E are illustration diagrams for producing the optical disc in the first embodiment.

FIG. 5A schematically shows the substrate 10 prepared. At the A face side 10A of the substrate 10, the convexoconcave pattern (grooves to be wobbling grooves) transferred from the stamper for the A face first recording layer L0A is formed. At the B face side 10B of the substrate 10, the convexoconcave pattern (grooves to be wobbling grooves) transferred from the stamper for the B face first recording layer L0B is formed.

[A Face L0 Forming Process F2]

As the process F2 of forming the A face L0, the substrate 10 is transferred to a sputtering apparatus, and processes F101, F102 and F103 shown in FIG. 4 are performed.

In the process F101, a dielectric is sputtered on one face of the substrate 10.

In the process F102, a recording film is sputtered.

In the process F 103, a dielectric is sputtered.

This forms the A face first recording layer L0A including the dielectric 11A, the recording film 12A and the dielectric 13A shown in FIG. 2.

Figure 5B:
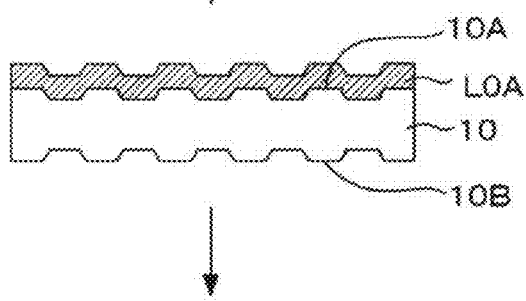

In FIG. 5B, the A face first recording layer L0A is formed on one face (at the A face side 10A) of the substrate 10.

[A Face Protection Layer Forming Process F3]

As the process F3 of forming the A protection layer, the process F104 shown in FIG. 4 is performed.

Figure 5C:

In other words, in the process F104, on the A face first recording layer L0A formed at the time as shown in FIG. 5B, a protection resin is applied as shown in FIG. 5C to form the A face protection layer 14A. For example, the protection resin is applied by a spin coating.

The A face protection layer 14A is provided with the feature of protecting the A face first recording layer L0A. For example, when the A face is placed in contact with the transfer table, a temperature control table or an apparatus such as a spin coater upon a transfer in a process line or in a half-finished product state, the A face is prevented from flaws by contacting with them and foreign matters such as dusts are prevented from attaching to the A face. In other words, the A face protection layer 14A has a hard coat feature for flaw prevention and a foreign matter attachment prevention feature as the protection feature to the A face first recording layer L0A.

Accordingly, the protection resin forming the protection layer 14A desirably has a hard film surface as the hard coat feature and a great contact angle for the foreign matter attachment prevention feature.

From these standpoints, polyether modified polydimethylsiloxane, polyacrylate modified polydimentylsiloxane, higher fatty acids, perfluoropolyether etc. are mixed with a urethane acrylate monomer, an epoxy acrylate monomer, a urethane acrylate copolymer, an epoxy acrylate copolymer, a light reaction initiator etc. to be used as the protection resin. In particular, polyether modified polydimethylsiloxane is desirable in that the hard coat feature and the foreign matter attachment prevention feature are sufficient, and the foreign matter attachment prevention feature is deactivated as described later.

[B Face L0 Forming Process F4]

As the process F4 of forming the B face L0 layer, the processes F105, F106 and F107 shown in FIG. 4 are performed.

The A face first recording layer L0A and the protection layer 14A are formed so far, as shown in FIG. 5C. In the process line, when the process F4 of forming the B face L0 is performed, the disc in production as shown in FIG. 5C is upside-down (turned over), and is transferred to the sputter apparatus in a state that the protection layer 14A is in contact with the transfer table etc.

In the process F105, a dielectric is sputtered on the other face (at the B face side) of the substrate 10.

In the process F106, a recording film is sputtered.

In the process F 107, a dielectric is sputtered.

This forms the B face first recording layer L0B including the dielectric 11B, the recording film 12B and the dielectric 13B shown in FIG. 2.

Figure 5D:
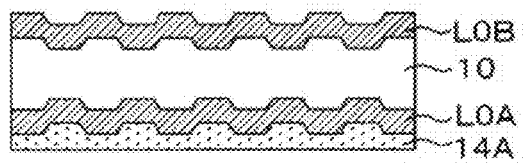

In FIG. 5D, the B face first recording layer L0B is formed on the substrate 10.

[A Face Protection Layer Forming Process F5]

As the process F5 of forming the A protection layer, the process F108 shown in FIG. 4 is performed.

Figure 5E:
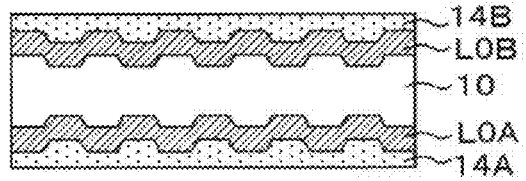

In other words, in the process F108, on the B face first recording layer L0B formed as shown in FIG. 5D, a protection resin is applied as shown in FIG. 5E to form the B face protection layer 14B.

In this process, the same protection resin as in the process F3 of forming the A face protection layer is used to form the B face protection layer 14B.

[B Face Protection Layer Deactivation Process F6]

As the process F6 of deactivating the B protection layer, the process F109 shown in FIG. 4 is performed. In the process F109, the protection feature, in particular, the foreign matter attachment prevention feature, of the B face protection layer 14 formed in the process F108 is deactivated. The foreign matter attachment prevention feature makes difficult to uniformly coat the resin thereon. Therefore, the foreign matter attachment prevention feature is deactivated.

It will be further described below as to the A face protection layer deactivation process F8.

[B Face Layer Configuration Forming Process F7]

As the process F7 of forming the B face layer configuration, the processes F110 to F116 shown in FIG. 4 are performed.

In the process F110, an intermediate layer resin for forming the intermediate layer 15B is applied, for example, by the spin coating. Since the foreign matter attachment prevention feature of the B face protection layer 14B is deactivated in the former process F 109, it is possible to uniformly apply the intermediate layer resin.

In the process F111, the convexoconcave pattern of the B face second recording layer L1B is transferred.

Specifically, the processes F110 and F111 are performed as follows: Firstly, the disc shown in FIG. 5E is set on the spin coater, and spin coated with an ultraviolet curing resin. Under this status, the stamper for the above-described B face second recording layer L1B is pressed to disc and the disc is irradiated with ultraviolet rays to cure the ultraviolet curing resin. After curing, the stamper for the B face second recording layer L1B is removed. The above-described processes form the intermediate layer 15B on which the convexoconcave pattern, for example, of the wobbling grooves is formed.

The disc in the state shown in FIG. 6A is subsequently transferred to the sputter apparatus, and the B face second recording layer L1B is formed.

In other words, in the process F112, a dielectric is sputtered on an upper face of the intermediate layer 15B.

In the process F113, a recording film is sputtered.

In the process F 114, a dielectric is sputtered.

This forms the B face second recording layer L1B including the dielectric 16B, the recording film 17B and the dielectric 18G shown in FIG. 2.

In the process F115, a cover resin is applied to the B face second recording layer L1B by the spin coating to form the cover layer 19B.

In the process F116, a hard coat material is applied to form the hard coat layer 20B.

This forms the total layer configuration at the B face side as shown in FIG. 6B.

[A Face Protection Layer Deactivation Process F8]

As the process F8 of forming the A face protection layer, the process F117 shown in FIG. 4 is performed.

The A face protection layer 14A is transferred and placed in contact with the transfer table etc. so far, as shown in FIG. 6B. After this, the layer configuration at the A face side is formed at the A face layer configuration forming process F9 as described next. In this case, the disc is placed such that the A face side is turned up. Therefore, the protection of the A face first recording layer L0A by the A face protection layer 14A is unnecessary.

As described above, the A face protection layer 14A has the hard coat feature and the foreign matter attachment prevention feature to the A face first recording layer L0A.

However, when the A face protection layer 14A has the foreign matter attachment prevention feature and is likely to repel the foreign matters, it is difficult to uniformly coat the intermediate layer forming resin on the A face protection layer 14A.

Therefore, in the process F117, the protection feature, in particular, the foreign matter attachment prevention feature, of the A face protection layer 14A is deactivated. Changing a state of the hard coat is unnecessary.

In order to deactivate the foreign matter attachment prevention feature, the A face protection layer 14A is exposed to ultra-short wave length UV and ozone before the intermediate layer resin is applied, thereby breaking a surface protection feature.

By deactivation of a surface active feature for preventing the foreign matters from attaching to the protection resin for forming the A face protection layer 14A, two phenomena occur concurrently (ultraviolet rays and ozone generate concurrently).

Firstly, by irradiating ultra-short wave length UV, molecular bonds in a surfactant included in the protection resin are cut and broken by photon energy of the UV to dissipate a surface active effect. Secondly, the surfactant is exposed to ozone (oxygen radials) to be oxidized and volatilized.

The ultra-short wave length UV and ozone are desirably generated by excimer UV having a light emission center wavelength of 172 nm using xenon as a discharge gas.

By irradiating the excimer UV, molecular bonds on a surface of a substance are cut, and hydrophilic groups such as COOH and OH are bonded to side chains to hydrophilize the surface.

In this way, the surface active feature is lost. It is then possible to uniformly apply the intermediate layer resin on the A face protection layer 14A.

The B face protection layer 14B is also deactivated in the former process F 109 as described above.

[A Face Layer Configuration Forming Process F9]

As the process F9 of forming the A face layer configuration, the processes F118 to F124 shown in FIG. 4 are performed.

In the process F117, by deactivating the foreign matter attachment prevention feature of the A face protection layer 14A, the disc in production is transferred and loaded to each apparatus in a state that the B face side is directed downward to perform the processes F118 to F124.

In the process F118, an intermediate layer resin for forming the intermediate layer 15A is applied to the A face protection layer 14A, for example, by the spin coating. Since the foreign matter attachment prevention feature of the A face protection layer 14A is deactivated, it is possible to uniformly apply the intermediate layer resin.

In the process F119, the convexoconcave pattern of the A face second recording layer L1A is transferred.

Specifically, the processes F118 and F119 are performed as follows: Firstly, the disc shown in FIG. 6B is set on the spin coater in a state the B face side is directed downward, and the A face is spin coated with an ultraviolet curing resin. Under this status, the stamper for the above-described A face second recording layer L1A is pressed to disc and the disc is irradiated with ultraviolet rays to cure the ultraviolet curing resin. After curing, the stamper for the B face second recording layer L1A is removed. The above-described processes form the intermediate layer 15A on which the convexoconcave pattern of the wobbling grooves is formed.

The disc in the state shown in FIG. 6C is subsequently transferred to the sputter apparatus, and the A face second recording layer L1A is formed.

In other words, in the process F120, a dielectric is sputtered on an upper face of the intermediate layer 15A.

In the process F121, a recording film is sputtered.

In the process F 122, a dielectric is sputtered.

This forms the A face second recording layer L1A including the dielectric 16A, the recording film 17A and the dielectric 18A shown in FIG. 2.

In the process F123, a cover resin is applied to the A face second recording layer L1A by the spin coating to form the cover layer 19A.

In the process F124, a hard coat material is applied to form the hard coat layer 20A.

This forms the total layer configuration at the A face side as shown in FIG. 6D. Thus, the whole layer configurations are formed at the A face side and the B face sides. The optical disc 1 having the layer configurations shown in FIG. 2 is formed.

The production method and the optical disc to be produced according to the first embodiment have the following advantages.

First of all, the A face first recording layer L0A can retain good quality.

From the process F4 of forming the B face L0 layer to the process F7 of forming the B face layer configuration (i.e., from the processes F105 to F116), the disc is transferred, stored temporary, and placed on the sputtering apparatus, the spin coater etc. in a state that the A face first recording layer L0A is at the lower side of the substrate 10. However, the A face first recording layer L0A is not exposed, and the A face protection layer 14A having the hard coat feature will be in contact with the transfer table etc. The A face first recording layer L0A is not directly contacted with the transfer line and the apparatus. Therefore, the flaws and dirt are prevented from attaching directly to the A face first recording layer L0A (the dielectric 11A, the recording film 12A and the dielectric 13A). As a result, the A face first recording layer L0A retains good quality.

Although the A face protection layer 14A is contacted with the transfer table etc., the dusts are repelled and do not remain attached, because the A face protection layer 14A has the foreign matter attachment prevention feature. Therefore, each layer will not be layered together with the foreign matters, when the A face layer configuration is formed. Also, from this point of view, the optical disc 1 retains good quality.

In addition, before the process of forming the A face layer configuration F9 (the processes F118 to F124) are performed, in the process of deactivating the A face protection layer F8 (the process F117), the protection feature of the A face protection layer 14A is deactivated.

In this way, the A face protection layer 14A will not repel the resin, whereby the intermediate layer 15A can be formed well with the uniform thickness. Also, from this point of view, the optical disc 1 to be produced retains good quality.

Also, the production line can have advantages.

Since the A face protection layer 14A prevents flaws and foreign matters from attaching, a cleaning management more than the usual to further decrease dusts on the transfer table, the conveyor and the like or a placement of a flaw prevention member is unnecessary.

In general, the disc production line is in a clean room so that dusts are strictly inhibited. However, dusts will not be entirely removed. Suppose that the A face first recording layer L0A of the double-sided disc having no A face protection layer 14A is protected, a clean room or a cleaning maintenance of the transfer table etc. is strictly necessary. In addition, the placement of the protection member for flaw prevention of the disc on the transfer table is necessary.

However, as the A face first recording layer L0A is protected by the A face protection layer 14A according to the embodiment, the equipment and maintenance in the past may be used. Thus, an increase in equipment and maintenance costs for quality maintenance can be avoided.

The transfer table in the process line has a site for cooling semi-finished discs upon the transfer. In other words, temperature of the transfer table itself is decreased so that the disc is cooled upon the transfer. In this case, when the protection member for flaw prevention of the disc is disposed on the transfer table, a cooling efficiency may be decreased. In some cases, the temperature has to be further decreased. This affects production costs and a production efficiency. However, once the A face protection layer 14A is protected by the A face first recording layer L0A, the placement of the protection member for flaw prevention on the transfer table is unnecessary. As a result, the cooling efficiency can be maintained, the production costs can be decreased and the production efficiency can be increased.

As an additional effect, the A face protection layer 14A may repair the A face first recording layer L0A.

As the A face first recording layer L0A, the dielectric 11A, the recording film 12A and the dielectric 13A are sputtered. In this case, a gentle undulation or concave area may be produced on the A face first recording layer L0. A quality of a signal recorded and regenerated at the area may be decreased. However, once the A face protection layer 14A is coated on the A face first recording layer L0, the undulation is repaired. Thus, a decrease in the signal quality can be prevented.

In the meantime, the B face first recording layer L0B is directed downward and has no chance to be in contact with the transfer table etc. during the processes shown in FIGS. 3A, 3B and 4. However, according to the embodiment, the B face protection layer 14B is formed on the B face first recording layer L0B. This is because of the following reasons.

By forming the B face protection layer 14B, the layer configurations of the optical disc 1 to be produced are symmetric with respect to the center of the substrate 10, as shown in FIG. 2.

In general, the optical disc may be undesirably deformed, e.g., warped, due to temperature environment. However, since the optical disc 1 according to the embodiment has the symmetric layer configurations, and expansion and contraction of respective layers due to a temperature change occur at the A and B face sides in a similar fashion. The expansion and contraction at the A and B face sides are canceled each other.

As a result, the optical disc 1 having the symmetric configuration according to the embodiment produced by the production method according to the embodiment can be rarely deformed, e.g., warped. Eventually, the optical disc 1 according to the embodiment has a good quality of signals to be recorded and regenerated.

As described above, the B face protection layer 14B may repair the B face first recording layer L0B. Accordingly, the B face protection layer 14B advantageously improves the quality of the optical disc 1 to be produced at the B face side.

Also, the A face protection layer 14A and the B face protection layer 14B improve durability (a storing performance) of the A face first recording layer L0A and the B face first recording layer L0B, thereby advantageously improving the quality of the optical disc 1.

3. Production of Optical Disc in Second Embodiment

FIG. 3B is a flow chart for producing an optical disc in a second embodiment.

The second embodiment is different from the first embodiment as illustrated in FIG. 3A in that the process F5 of forming the B face protection layer and the process F6 of deactivating the B protection layer are not performed. Referring to FIG. 4, the processes F108 and F109 are not performed.

In other words, after the B face first recording layer L0B is formed at the process F4 of forming the B face L0 layer, the layer configuration including the B face second recording layer L1B will be formed on the B face first recording layer L0B at the process F7 of forming the B face layer configuration.

Since otherwise is similar, the description about each of the processes F1 to F4, F8 and F9 will not be repeated.

Figure 7:
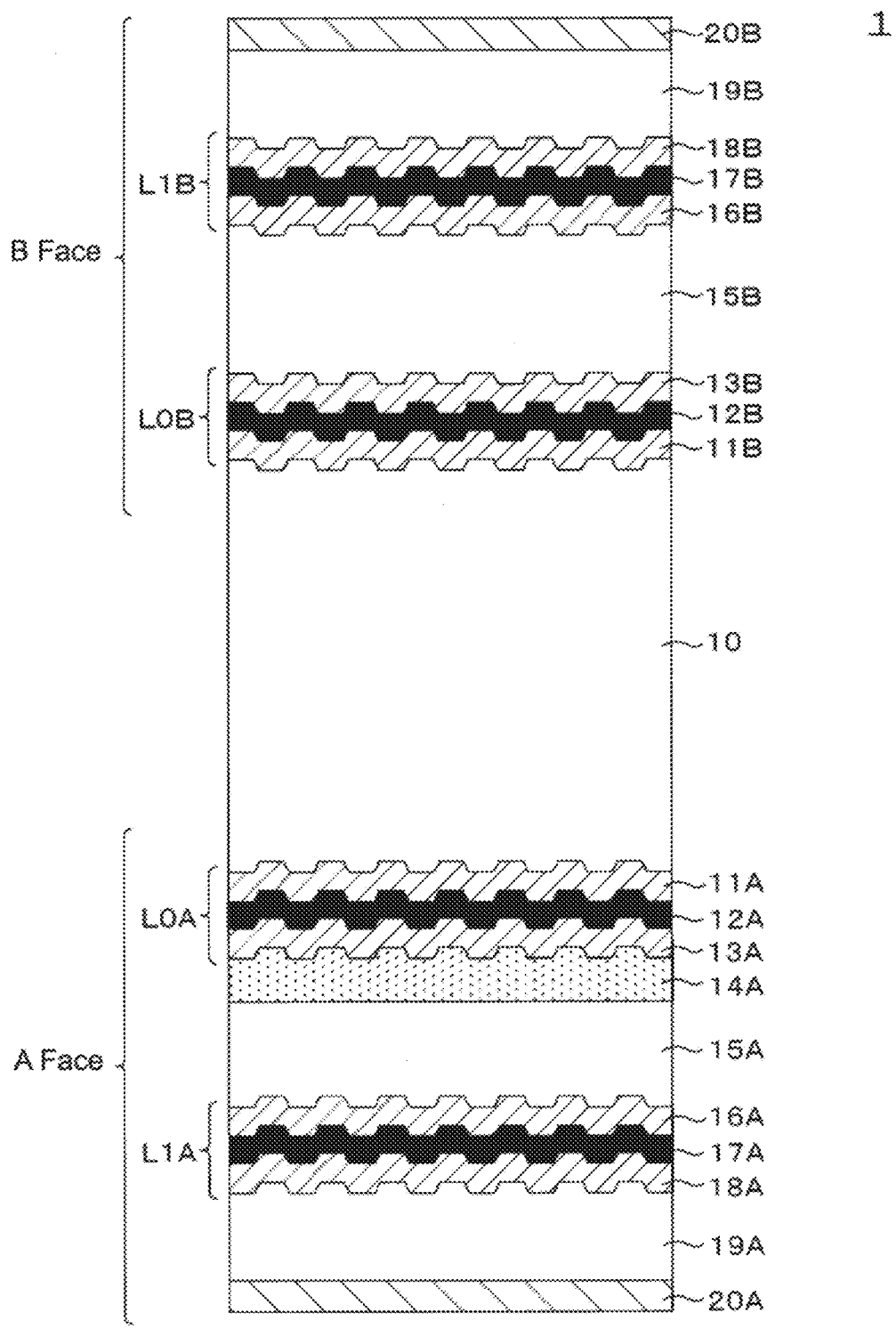
FIG. 7 is an illustration diagram of layer configurations of the optical disc in the second embodiment.

The optical disc 1 produced has the layer configurations as shown in FIG. 7.

The layer configurations are different from that in FIG. 2 in that no B face protection layer 14B is formed at the B face side. Therefore, the intermediate layer 15B has, for example, a thickness of 25 μm which desirably equals to a total thickness of the intermediate layer 15A at the A face side (for example, 22 μm) and the A face protection layer 14A (for example, 3 μm).

As described above, the B face first recording layer L0B is not in contact with the transfer table etc. during the processes. Accordingly, the protection feature is not indispensable.

Thus, in the case of the optical disc product where the symmetric configuration of the optical disc 1 produced and a repair feature of the B face first recording layer L0B by the B face protection layer 14B are not so valued, the B face protection layer 14B may not be formed as in the second embodiment.

In this case, the production process can be advantageously simplified as compared with the first embodiment.

4. Experimental Results

Experimental results of the protection feature of the A face protection layer 14A are shown.

Figure 8A:
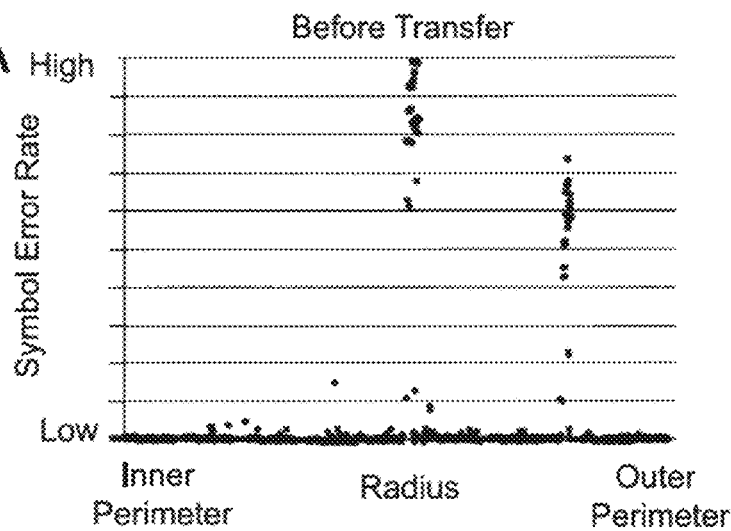
FIGS. 8A, 8B and 8C are each a graph of an SER measurement showing an effect of a protection layer.
Figure 8B:
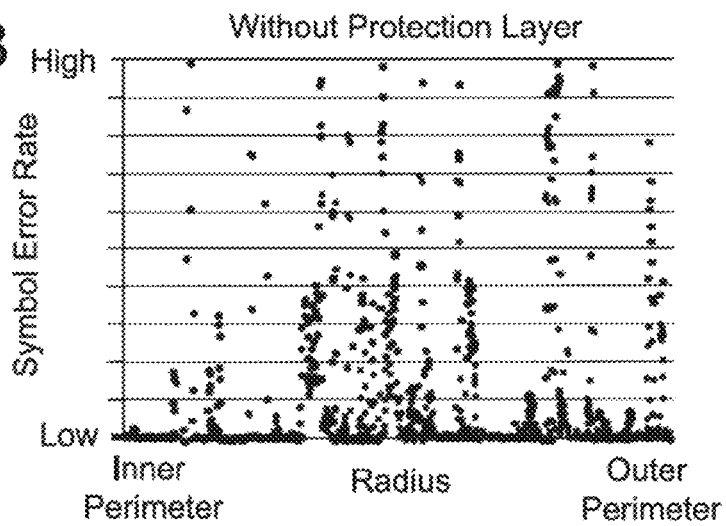
Figure 8C:
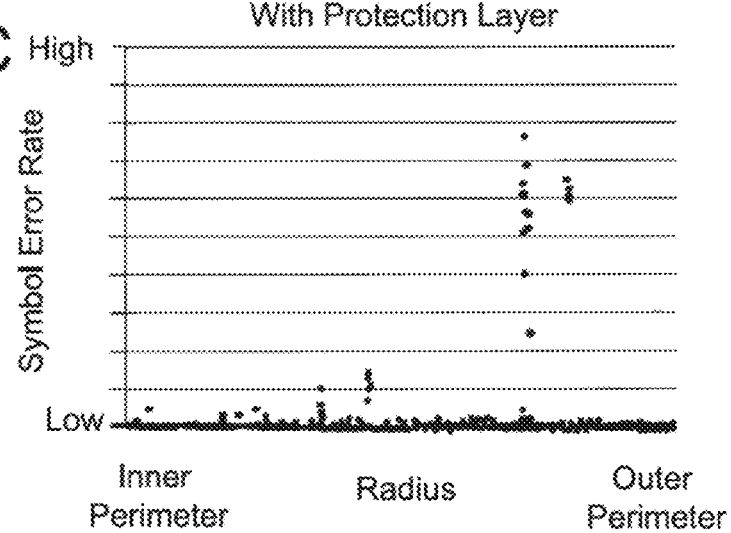

FIGS. 8A, 8B and 8C each shows the result of measuring an SER (Symbol Error Rate) upon regeneration of data recorded on optical discs to be tested.

An abscissa axis represents a position of the disc in a radial direction (a part of the radial range).

As experimental samples 1 and 2, semi-finished discs including the recording layers were produced. After the recording layers were formed, data was recorded and regenerated to measure to the SER.

Thereafter, the experimental sample 1 was transferred by the transfer table without applying the protection resin to the recording layer. After the transfer, the data on the surface in contact with the transfer table was recorded and regenerated to measure the SER.

The experimental sample 2 was transferred by the transfer table by applying the protection resin to the recording layer. After the transfer, the data on the surface in contact with the transfer table was recorded and regenerated to measure the SER.

FIG. 8A shows the SER measured before the transfer of the samples 1 and 2 (as to the sample 2, before the transfer and before the coating resin is applied). It is found that some parts (radius position) have degraded SERs.

Since the samples 1 and 2 had almost the same SER measurement result before the transfer, the result is shown as one graph.

FIG. 8B shows the SER measured after the transfer of the sample 1 with no protection resin applied. As shown in FIG. 8B, the SER was significantly degraded. This is because the recording layer was flawed or the foreign matters were attached thereto upon the transfer.

FIG. 8C shows the SER measured after the transfer of the sample 2 with the protection resin applied. As compared with the SER before the transfer, the SER is little degraded. It can be confirmed that the recording layer is protected by the protection resin.

The experimental results reveal that the A face first recording layer L0A is properly protected by forming the A face protection layer 14A in the production process according to the second embodiment.

In addition, when FIG. 8C is compared with FIG. 8A, it is found that the SER is improved at the radial position where the SER is high before the transfer. It is assumed that the protection resin repairs the A face first recording layer L0A.

Next, an effect of deactivating the foreign matter attachment prevention feature on the A face protection layer 14A and the B face protection layer 14B will be described.

FIG. 9A is a photograph of the sample to which the intermediate resin was applied without the deactivation treatment. FIG. 9B is a photograph of the sample to which the intermediate resin was applied with the deactivation treatment.

FIG. 9A shows that the resin was repelled and was not applied uniformly. On the other hand, FIG. 9B shows that the resin was applied uniformly.

It is therefore found that the deactivation of the foreign matter attachment prevention feature on the A face protection layer 14A and the B face protection layer 14B before the layer configurations are formed thereon is important to form uniformly the intermediate layers 15A and 15B and to produce the optical disc 1 having a good quality.

5. Modifications

Although the production method and the optical disc according to the embodiments have been described, a variety of modifications may be possible.

In the embodiments, it is assumed that the A face refers to the first face in claims, and the B face refers to the second face in claims. It is assumed for purposes of illustration only, and the first face in claims may be the B face, and the second face in claims may be the A face.

In the embodiments, the recording layers have the configuration of "dielectric/recording film/dielectric" as an example. However, the production method according to the embodiments can be applied to double sided discs of a write once type and a rewritable type, or the read-only discs.

The optical disc 1 having the protection layer according to the embodiments can be applied as a variety of the recordable discs and the read-only discs.

A variety of the layer configurations of the recording layer can be considered as long as the protection layer has the protection feature to the recording layer.

The embodiments show the optical disc 1 having no reflection film. For example, this configuration is for the case where a reflected light amount is provided by interfacial reflection of the recording layer. The technology according to the present disclosure can be applied to the configuration where a reflection film is disposed on the convexoconcave pattern of the recording layer. In other words, the protection layer may be disposed on the recording layer including the reflection film that may be possibly in contact with the transfer table etc. in the processes.

The embodiments show the optical disc having two recording layers on both faces (i.e., two layers on one face). The technology according to the present disclosure can be applied to the production of the optical disc having three or more layers on one side.

In this case, if the second or later recording layers on each surface may be possibly in contact with the transfer table etc., the protection layer may be formed on the recording layers.

The processes are not limited to the embodiments shown in FIGS. 3A, 3B and 4. In the process of forming the layer configurations, a number of modifications including the forming order of the respective layers at the A and B face sides and the timing of turning over upside-down the A face side and the B face side may be possible. For example, in FIG. 4, all remaining layer configurations are formed during the processes F110 to 116 as the process F7 of forming the B face layer configuration. However, it may be possible that the layer configurations at the A side are formed after a part of the layer configurations is formed.

In either case, the protection layer may be formed on one or a plurality of recording layers that will disposed at the lower side at the time of storage of the semi-finished discs. Therefore, a plurality of protection layers may be formed on one side.

In view of the symmetric configuration, a repair feature of the recording layer by the protection layer, and a feature for improvement of the durability, the protection layer may be formed on the recording layer that is not in contact with the transfer table etc. such as the B face first recording layer L0B in to the first embodiment as described above.

The technology of the present disclosure can be applied not only to the optical disc recording medium and its production method, but also a card (non-circular) type recording medium and its production method.

The present disclosure may have the following configurations.

(1) A method of producing a recording medium, including:
preparing a substrate of the recording medium;
forming a first face recording layer at a first face side of the substrate;
forming a first face protection layer for protecting the first face recording layer on the first face recording layer;
forming a second face constituting whole or a part of a layer configuration at a second face side of the substrate;
deactivating a protection feature of the first face protection layer; and
forming a first face constituting whole or a part of a layer configuration of a first face on the first face protection layer.

(2) The method of producing a recording medium according to (1) above, forming the second face layer includes
forming a second face recording layer on the second face of the substrate; and
forming a second face layer configuration including other recording layer on the second face recording layer.

(3) The method of producing a recording medium according to (1) or (2) above, forming the second face layer includes
forming a second face recording layer on the second face of the substrate;
forming a second face protection layer for protecting the second face recording layer on the second face recording layer;
deactivating a protection feature of the second face protection layer; and forming a second face layer configuration including other recording layer on the second face recording layer.

(4) The method of producing a recording medium according to any one of (1) to (3) above, forming the first face layer includes forming a layer configuration including other recording layer at a first face side on the first face protection layer.

(5) The method of producing a recording medium according to any one of (1) to (4) above, in which the first face protection layer is formed with a material expressing a hard coat feature and a foreign matter attachment prevention feature to the first face recording layer as the protection feature.

(6) The method of producing a recording medium according to (5) above, deactivating a protection feature of the first face protection layer includes deactivating the foreign matter attachment prevention feature of the first face protection layer.

(7) The method of producing a recording medium according to (5) or (6) above, deactivating a protection feature of the first face protection layer includes irradiating the first face surface protection layer with an excimer UV.

It should be understood by those skilled in the art that various modifications, combinations, sub-combinations and alterations may occur depending on design requirements and other factors insofar as they are within the scope of the appended claims or the equivalents thereof.

What is claimed is:

1. A method of producing a recording medium, comprising:
   preparing a substrate of the recording medium;
   forming a first face recording layer at a first face side of the substrate;
   forming a first face protection layer for protecting the first face recording layer on the first face recording layer;
   forming a second face constituting whole or a part of a layer configuration at a second face side of the substrate;
   deactivating a protection feature of the first face protection layer; and
   forming a first face constituting whole or a part of a layer configuration of a first face on the first face protection layer.

2. The method of producing a recording medium according to claim 1, forming the second face layer includes
   forming a second face recording layer on the second face of the substrate; and
   forming a second face layer configuration including other recording layer on the second face recording layer.

3. The method of producing a recording medium according to claim 1, forming the second face layer includes
   forming a second face recording layer on the second face of the substrate;
   forming a second face protection layer for protecting the second face recording layer on the second face recording layer;
   deactivating a protection feature of the second face protection layer; and
   forming a second face layer configuration including other recording layer on the second face recording layer.

4. The method of producing a recording medium according to claim 1, forming the first face layer includes
   forming a layer configuration including other recording layer at a first face side on the first face protection layer.

5. The method of producing a recording medium according to claim 1, wherein
   the first face protection layer is formed with a material expressing a hard coat feature and a foreign matter attachment prevention feature to the first face recording layer as the protection feature.

6. The method of producing a recording medium according to claim 5, deactivating a protection feature of the first face protection layer includes
   deactivating the foreign matter attachment prevention feature of the first face protection layer.

7. The method of producing a recording medium according to claim 5, deactivating a protection feature of the first face protection layer includes
   irradiating the first face surface protection layer with an excimer UV.

8. A recording medium produced by a method of producing a recording medium, comprising:
   preparing a substrate of the recording medium;
   forming a first face recording layer at a first face side of the substrate;
   forming a first face protection layer for protecting the first face recording layer on the first face recording layer;
   forming a second face constituting whole or a part of a layer configuration at a second face side of the substrate;
   deactivating a protection feature of the first face protection layer; and
   forming a first face constituting whole or a part of a layer configuration of a first face on the first face protection layer.

* * * * *